Jan. 26, 1937.　　　　E. C. HORTON　　　　2,069,070
WINDSHIELD CLEANER MOTOR
Filed July 5, 1934
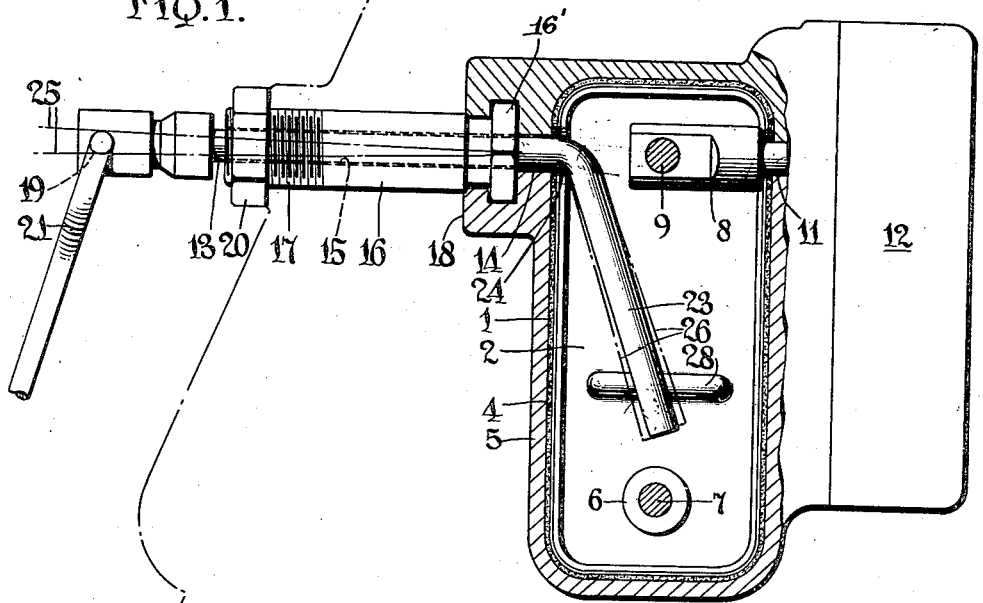
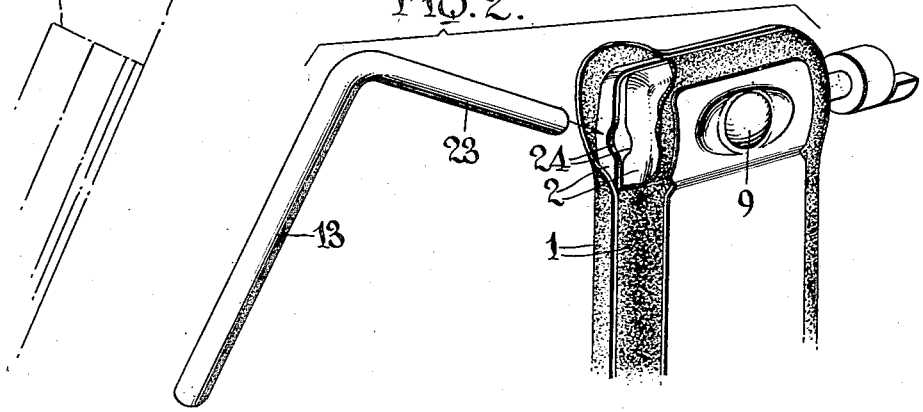
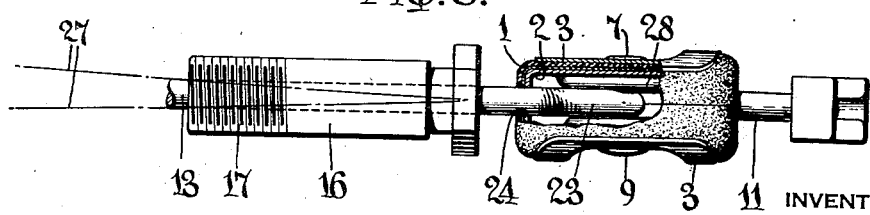
INVENTOR
Erwin C. Horton,
BY
Beau & Brooks.
ATTORNEYS Patented Jan. 26, 1937

2,069,070

UNITED STATES PATENT OFFICE 2,069,070

WINDSHIELD CLEANER MOTOR

Erwin C. Horton, Hamburg, N. Y., assignor to Trico Products Corporation, Buffalo, N. Y.

Application July 5, 1934, Serial No. 733,919

9 Claims. (Cl. 121—97)

This invention relates to a windshield cleaner motor and primarily to that type wherein the cleaner motor is provided with a mounting sleeve about its wiper operating shaft.

In the present day motor vehicle, the windshield cleaner motor is usually disposed within the vehicle body construction and has its wiper operating shaft protruding to the exterior through an opening provided in the vehicle wall structure. Frequently the motor housing is provided with a mounting sleeve extending about the wiper operating shaft for a distance and by which the motor is mounted on the vehicle, the outer end of the sleeve being usually threaded to receive a clamping nut. It is the practice in mounting this type of cleaner motor to dispose the motor at the inner side of the wall structure with the mounting sleeve extending through an opening therein, and then applying the clamping nut to the protruding end of the sleeve so as to firmly clamp the motor housing at the interior side against the interposed wall structure. In tightening the clamping nut it sometimes happens, due to various reasons such as improper alignment of parts and unparallel faces of the wall structure, that the mounting sleeve will be sprung or angularly displaced and result in a binding action against the wiper operating shaft. Such action not only places an additional load upon the light motor, but also subjects the frail motor parts to undue strain and tension.

The present invention has for its object to provide a windshield cleaner motor which eliminates such objections and disadvantages in mounting the same, and one wherein the operation and action of the motor is rendered more efficient in its operation.

The invention comprehends the connection of the wiper actuating shaft directly to its operating piston in a flexible or universal manner, leaving the piston and shaft relatively free for more or less floating movement and self-adjustment in their respective guiding parts, so that they will be relieved of distorting strain or binding action due to relative displacement of parts incidental to the mounting of the motor on the vehicle.

In the drawing:

Fig. 1 is a sectional view through the motor, parts being left in elevation, showing the preferred embodiment of the present invention;

Fig. 2 is a detailed perspective view illustrating the manner of assembling the shaft and piston; and Fig. 3 is somewhat diagrammatic and depicts the lateral adjustment permitted the shaft in order to adapt the motor to various mountings on the vehicle.

Referring more particularly to the drawing, the windshield cleaner motor herein illustrated is of the swinging piston or vane type. The piston is provided with a pair of cupped packing members 1 having their packing flanges extending toward each other and their body portions reinforced and supported on opposite sides by inner and outer body plates 2 and 3 so that the two piston sections (each comprising the cupped packing and the enclosing body plates 2 and 3) serve to efficiently pack the piston against air leakage as it moves back and forth in the piston chamber 4 of the motor casing 5. The inner plates 2 at their outer end portions embrace an interposed spacing washer 6, and the piston sections are securely united by the rivet 7 passing through the washer. The inner end portions of the piston sections embrace an interposed valve actuating shaft 8, being secured thereto by the fastener 9. The shaft 8 projects from between the piston sections and has a journal bearing in the motor casing or housing, as at 11. The outer end of the shaft extends into a valve chamber 12 and serves to operate a valve mechanism (not shown) by which fluid pressure is operatively applied to the piston to oscillate it about the axis of the shaft.

Extending from the opposite side of the piston, coaxial with the shaft 8 is a wiper actuating shaft 13 which is journalled in the opposite wall bearing 14 of the motor casing and also given further support in bearing 15 of the motor mounting sleeve 16. This sleeve may be made a part of the motor casing in a manner somewhat similar to that shown in Patent No. 1,712,160, granted May 17, 1929, to John R. Oishei, by having its flanged inner end 16' clamped between separable parts of the motor casing. By reason of mechanical tolerance in the fitting of these parts, the sleeve has a slight freedom of movement so that its outer end may yield laterally. The outer end of the mounting sleeve is threaded at 17 to receive a clamping nut or member 20 so that when the mounting sleeve is inserted through an opening in the windshield, or other mounting structure of the vehicle, the nut may be applied to draw the opposing clamping face 18 of the motor casing firmly against the interposed mounting structure. The outer end of the wiper actuating shaft is provided with an arm receiving opening 19 by which the wiper arm 21 and its supported wiper 22 are attached.

When tightening the clamp nut 20 to secure the cleaner motor in position, the opposite surfaces of the interposed windshield structure are sometimes out of true parallelism or uneven, and this will result in causing the mounting sleeve 16 to become angularly displaced or canted, with reference to the axis of rotation or oscillation of the piston 1, so that the outer end portion of the sleeve will bind against the shaft 13 and set up consequential strains therein as well as in the piston. To avoid this impairment in the efficiency of the light motor, the shaft 13 is given a flexible or universal connection with the piston so that it may have a certain amount of freedom of movement relative to the motor casing to adjust itself to any angular displacement of the outer end of the mounting sleeve incidental to the mounting of the motor casing on the vehicle.

To this end the present disclosure depicts the inner end of the wiper actuating shaft as being bent downwardly, to provide a crank extension 23, and engaged in the pocket formed by and between the sections of the piston. The marginal portions of the inner piston plates 2 are shaped to define a shaft receiving opening 24 through which the crank extension 23 is inserted or removed to facilitate the assembling and dismantling of the motor. This connection between the shaft 13 and its piston is preferably accomplished and broken when the latter is removed from its motor chamber. The piston opening 24 is of such size as to permit slight pivotal movement of the shaft 13 sufficient to enable the latter to accommodate itself to any displacement of the sleeve 16 which may result from mounting the motor. There is also a certain clearance or tolerance provided in the bearing 14 through which the outside atmospheric pressure may enter between the packing members 1 for acting outwardly on their flanges.

If the outer end of shaft 13 has been displaced up or down from the axis of rotation of the piston, such displacement being indicated on an exaggerated scale by lines 25 in Fig. 1, the inner or crank end portion 23 of the shaft will likewise move to adjust itself between the inner plates 2 of the piston as indicated by the broken lines 26 in Fig. 1. If the movement of the shaft is sidewise, as indicated by the broken lines 27 in Fig. 3, it will take place substantially about the axis of the crank extension 23. Consequently, when the motor is in operation, the piston and the wiper shaft will oscillate about different axes which are angularly displaced from each other and, because of this fact, the extension 23 will continue its movements within the piston. The inner plates 2 of the piston may be provided with elongated bosses or ribs 28 adjacent the free end of the crank extension 23 to guide the latter in its movements in the piston pocket.

In practice, if the mounting sleeve becomes angularly displaced when the motor is mounted in position on the motor vehicle, then the wiper actuating shaft 13 will follow or adjust itself to the deflection of the sleeve and always maintain its free bearing engagement with the bearings 14 and 15. When the piston is oscillated back and forth, the flexible connection effected by the crank extension 23 will permit the shaft to have oscillatory movement freely imparted thereto by the piston without any binding action either on the shaft or on the piston. The piston and the wiper shaft will therefore be free of any abnormal strain and binding and will more or less be moving independently of each other.

What is claimed is:

1. A windshield cleaner comprising a motor casing provided with a piston chamber, a piston oscillatable in the chamber and having a transversely extending pocket, a mounting sleeve connected to the casing and subject to slight angular displacement, means cooperating with the sleeve to secure the motor on a vehicle, and a wiper actuating shaft journalled in the sleeve, the inner end of the shaft being provided with an angular extension removably engaged in the piston pocket for movement transversely of the piston movement to permit the shaft oscillating about an axis at an angle to the axis of the piston movement.

2. A fluid pressure operated motor for windshield cleaners, comprising a motor casing having a piston chamber and piston adapted for swinging in the piston chamber, a wiper operating shaft loosely journalled in the casing for angular displacement and having a crank part movably connected to the piston to permit the shaft to become angularly displaced relative to the axis of piston movement.

3. A windshield cleaner motor having a casing provided with a chamber, a shaft journalled in the casing and subject to angular displacement in its journal bearing, means in the casing chamber for imparting a rotary movement to the shaft, and a universal connection between said means and said shaft for maintaining a driving relationship therebetween while permitting of such angular displacement, such angular displacement being relative to said means.

4. A windshield cleaner motor having a motor casing provided with a piston chamber, a piston oscillatable in the chamber, a shaft having loose journal support in the motor casing for angular displacement, and a loose connection between the shaft and the piston permitting angular displacement therebetween during operation.

5. A motor having a casing provided with a piston chamber, a piston oscillatable in the chamber about an axis, a mounting sleeve, loosely connected to the motor casing, a shaft loosely journalled in the motor casing and extending through the sleeve, and means flexibly connecting the shaft to the piston for relatively angular displacement.

6. A motor casing provided with an arcuate piston chamber, a piston oscillatable in the chamber about an axis, a shaft loosely journalled in the motor casing substantially coaxial with the piston, means for mounting the casing, and means flexibly connecting the shaft to the piston within the chamber for permitting relatively angular displacement.

7. A windshield cleaner motor having a motor casing provided with a piston chamber, a piston reciprocable in the chamber, a mounting sleeve connected to the motor casing, means cooperating with the sleeve to secure the casing on a vehicle, a shaft journalled in the sleeve and also loosely journaled in the motor casing, and means flexibly connecting the shaft to the piston for relatively angular displacement.

8. A windshield cleaner motor having a motor casing provided with a piston chamber, a piston oscillatable in the chamber and having a transversely extending pocket, a mounting sleeve connected to the casing for slight angular displacement, means cooperating with the sleeve to secure the motor on a vehicle, and a shaft journalled in the sleeve and having a part extending at an angle into the piston pocket for movement transverse of the piston movement.

9. A windshield cleaner motor comprising a casing having a piston chamber, a piston oscillatable therein, a shaft supported in a journal bearing in the casing substantially axially of the chamber and means flexibly connecting the shaft to the piston in a manner to permit angular displacement of the shaft from a truly axial position with respect to the path of movement of the piston.

ERWIN C. HORTON.